United States Patent [19]

Rilly

[11] 4,331,908

[45] May 25, 1982

[54] CIRCUIT FOR STABILIZED POWER SUPPLY IN CONJUNCTION WITH THE HORIZONTAL SCANNING CIRCUIT OF A VIDEO-FREQUENCY RECEIVER

[75] Inventor: Gérard Rilly, Paris, France

[73] Assignee: Thomson-Brandt, Paris, France

[21] Appl. No.: 58,978

[22] Filed: Jul. 20, 1979

[30] Foreign Application Priority Data

Jul. 25, 1978 [FR] France ............................ 78 21270

[51] Int. Cl.³ .............................................. H01J 29/70
[52] U.S. Cl. ................................. 315/411; 358/190
[58] Field of Search ................. 315/411; 358/190, 243

[56] References Cited

U.S. PATENT DOCUMENTS 3,970,780  7/1976  Minoura .............................. 315/411
4,162,434  7/1979  Dietz ................................... 315/408

FOREIGN PATENT DOCUMENTS 2144827  3/1973  Fed. Rep. of Germany ...... 315/411
7419048  12/1974  France .

Primary Examiner—Theodore M. Blum
Attorney, Agent, or Firm—Roland Plottel

[57] ABSTRACT

Wave-chopping is performed by means of an active switch, said switch being unidirectional in voltage and bidirectional in current and connected in series with a secondary winding of the horizontal-scanning transformer. The secondary winding is connected in series with an inductance coil which is not coupled to the transformer and with a polarized capacitor, the output voltage being collected at the terminals of the capacitor.

The power supply circuit is employed in video-frequency receivers having low dissipation.

8 Claims, 3 Drawing Figures

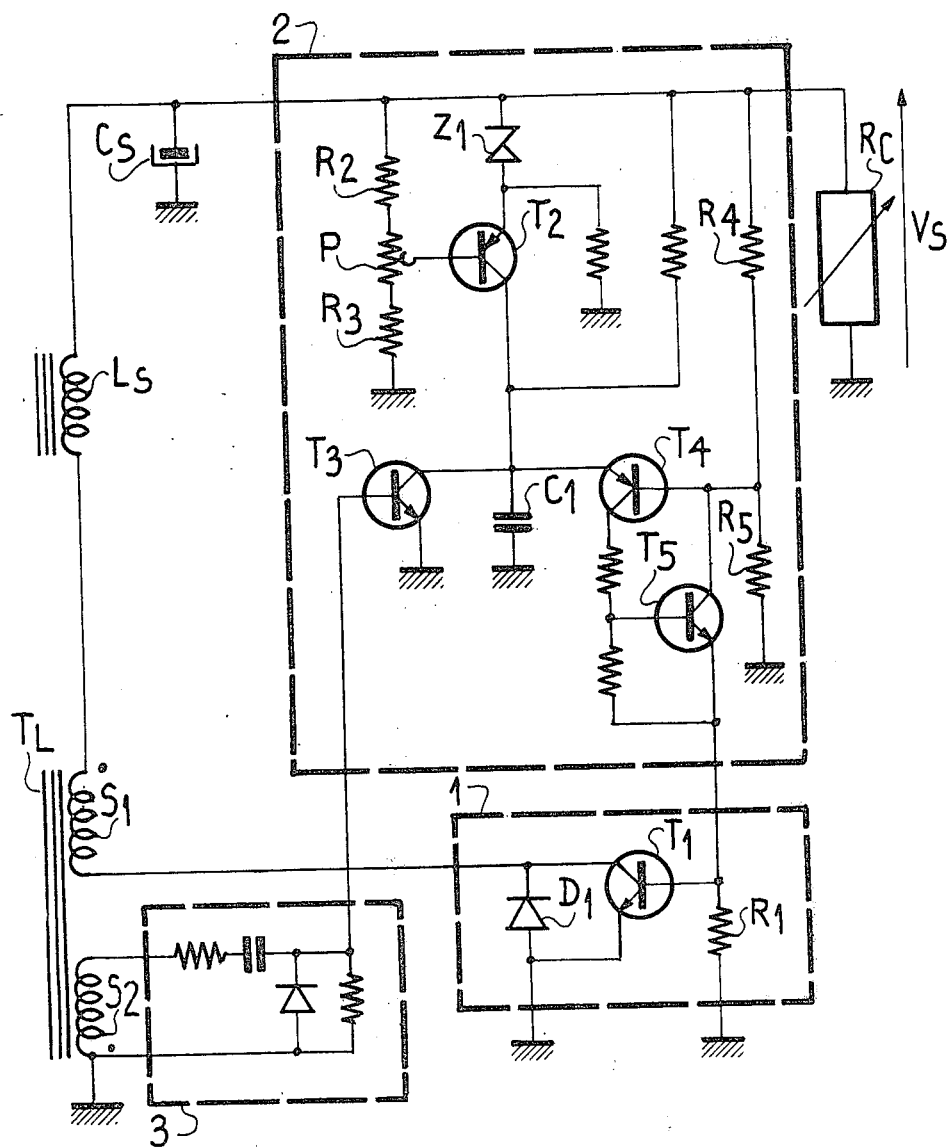
FIG_1

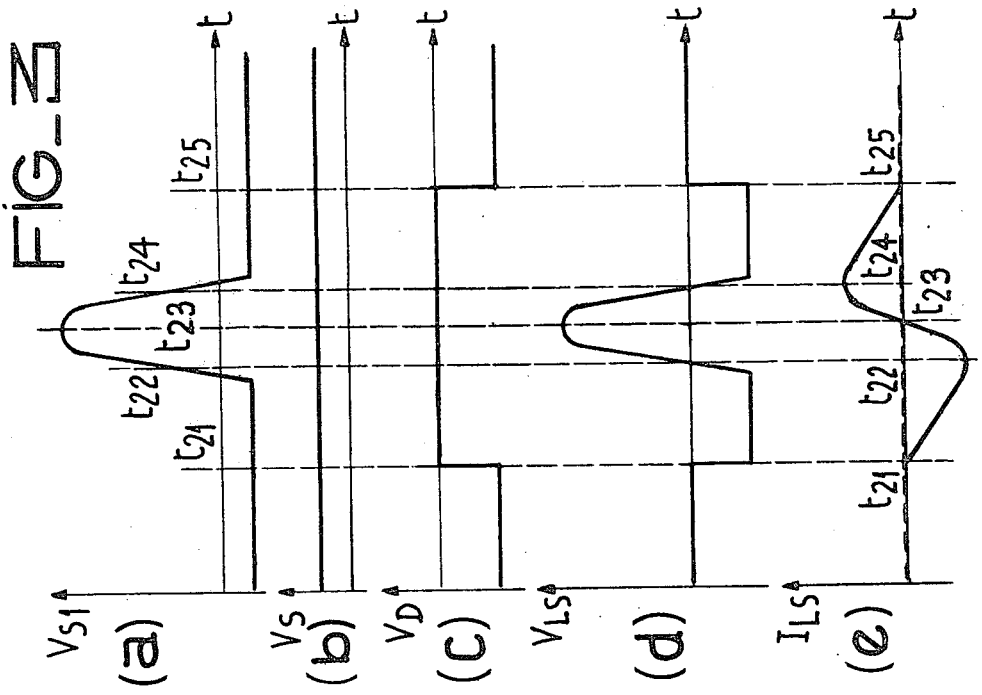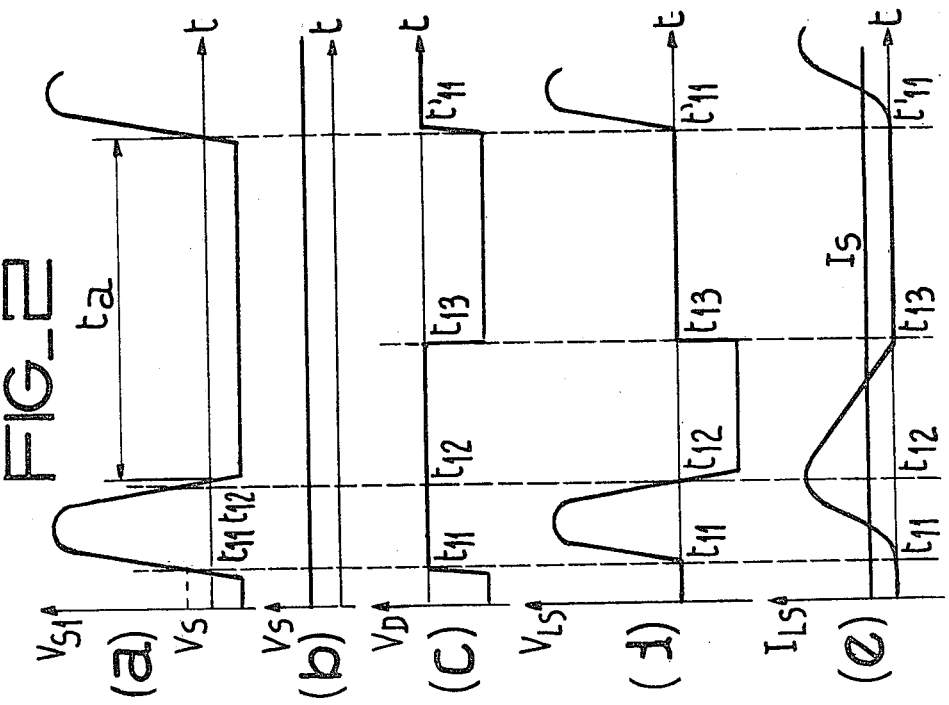

CIRCUIT FOR STABILIZED POWER SUPPLY IN CONJUNCTION WITH THE HORIZONTAL SCANNING CIRCUIT OF A VIDEO-FREQUENCY RECEIVER

This invention relates to a stabilized auxiliary power supply circuit operating from the horizontal scanning circuit of a video-frequency receiver.

Auxiliary power supplies of this type are obtained from the line-scanning signal and serve, for example, to supply the output stage of the video-frequency amplifier of a receiver.

The line-scanning circuit has the design function of delivering a current having a sawtooth waveform at the line frequency to the horizontal deflection coils. This current undergoes a progressive transition from a negative value to a positive value during a line-scanning trace or forward interval and is then suddenly reversed at the instant of commencement of a line retrace interval. At the instant of reversal, an overvoltage appears across the terminals of the horizontal deflector and is known as a line retrace pulse.

Said overvoltage is turned to profitable account in order to obtain the extra high tension (EHT) required by the accelerating anode of a cathode-ray tube and in order to provide auxiliary power supplies.

With this objective, the primary winding of a so-called EHT transformer is connected in parallel with the horizontal deflection coils and one of the secondary windings of said transformer is employed as an alternating-current source for the auxiliary power supply.

Said secondary winding delivers line retrace pulses which are rectified by means of a diode and filtered by a polarized capacitor so as to obtain a d.c. voltage.

When the line-scanning circuit is supplied from a well-regulated supply source, the voltage obtained by rectification during the line-scanning retrace interval as described in the foregoing is relatively stable.

Although systems of this type are of very simple design, they nevertheless prove to be of very limited value when it is desired to have a low internal impedance. This drawback primarily arises from the influence of the very high leakage inductances of the EHT transformer.

It is in fact necessary in this case to make use of additional regulating systems mounted in series with the diode and capacitor system which often proves highly dissipative.

Systems of this type must also be employed when the supply voltage of the line-scanning circuit is not perfectly regulated.

The invention proposes to remove the disadvantages just mentioned and to produce a power supply source from line retrace signals, said source being very well regulated and designed to achieve a very low level of dissipation.

A further advantage of the power supply according to the invention lies in the fact that it has a self-limited current output. In other words, in respect of a zero value of the load at the output of the power supply according to the invention, the current delivered by this latter has a limited maximum value without having recourse to additional circuits. Similarly, the operation in accordance with the invention includes the possibility of a zero value of the mean current delivered by the power supply in respect of a given value of the load.

In accordance with the invention, a suitable chopping operation is carried out in order to regulate the voltage collected at the terminals of a secondary winding of the EHT transformer and rectified by means of an active switch which is bidirectional in current and solely unidirectional in voltage.

Further distinctive features of the invention will become apparent from the following description which is given by way of example and not in any limiting sense, reference being made to the accompanying drawings in which:

FIG. 1 is a diagram of a stabilized supply circuit according to the invention;

FIG. 2 provides graphical representations of the different voltages and currents within a stabilized supply circuit in which it is assumed that chopping is performed solely by means of a passive switch;

FIG. 3 provides graphical representations of the different voltage and currents within a stabilized power supply circuit in which chopping is performed by an active switch in accordance with the invention.

FIG. 1 is a diagram of a stabilized supply circuit in accordance with the invention.

The winding $S_1$ is a secondary winding of the line transformer $T_L$ or EHT transformer.

$L_S$ is an inductance coil which is not coupled to the inductance coil of the winding $S_1$. The negative terminal of the polarized filter capacitor $C_S$ is connected to ground and the positive terminal of said capacitor is connected to one terminal of the inductance coil $L_S$.

The active switch 1 comprises a transistor $T_1$ and a diode $D_1$. The diode $D_1$ is mounted in parallel with the transistor $T_1$, its cathode being connected to the collector of transistor $T_1$ and its anode being connected to the emitter of transistor $T_1$. Said transistor $T_1$ is controlled by the value of its base-emitter voltage imposed by the resistor $R_1$ and a control circuit.

When the base-emitter voltage is zero, the transistor $T_1$ is said to be in the open state or in other words has an infinite impedance between its collector and its emitter. By applying a base-emitter voltage of suitable value, the transistor changes from said open state to a so-called closed state; it then has a practically zero impedance between its collector and its emitter.

The active switch 1 is said to be bidirectional in current and unidirectional in voltage since a voltage of only one polarity can appear at its terminals whereas currents of opposite direction can flow through the switch.

The base of transistor $T_1$ is connected to a control circuit 2 which is synchronized with the line frequency by means of the circuit 3.

The resistor $R_C$ represents the equivalent output load of the power supply which is stabilized at a voltage $V_S$.

The mode of operation contemplated by the present invention will be more clearly understood if it is supposed in a first stage that only the diode $D_1$ is in service in the switch 1, in which case a so-called passive switch chopping operation takes place, the different waveforms of currents and voltages being shown in FIG. 2.

FIG. 2a shows diagrammatically the waveform of the voltage $VS_1$ delivered by the secondary winding $S_1$ of the line transformer as a function of the time t.

Said voltage $VS_1$ has a practically sinusoidal waveform and is periodic at the line frequency; the time interval ta represents the time taken to scan one line, designated as the trace interval.

The capacitor $C_S$ is of sufficiently high value to ensure that the a.c. voltage across its terminals is negligible.

FIG. 2b represents the output voltage $V_S$ at the terminals of the load Rc as a function of the time t; FIG. 2c represents the voltage $V_D$ at the terminals of the diode $D_1$ as a function of the time t; and FIG. 2d represents the voltage $V_{LS}$ at the terminals of the inductance coil LS as a function of the time t.

The voltage $V_{S1}$ is equal to the sum of the three voltages $V_S$, $V_D$ and $V_{LS}$. Prior to the instant $t_{11}$ represented in FIGS. 2, the diode $D_1$ is cut-off since the voltage $V_{S1}$ is negative. This diode is in fact reverse-biased by a voltage which is negative with respect to the references chosen. The diode accordingly performs the function of circuit-breaker, thus preventing any flow of current $I_{LS}$ through the inductance coil $L_S$ as shown in FIG. 2c as a function of the time t. The voltage $V_{LS}$ at the terminals of the coil $L_S$ is also of zero value.

The instant $t_{11}$ is defined by the nullification of the voltage across the terminals of the assembly $L_S$, $D_1$. The voltage $V_S$ is then equal at this instant to the voltage $V_{S1}$ which has become positive.

After said instant $t_{11}$, the voltage $V_{S1}$ continues to increase and the voltage $V_{LS}$ becomes positive. The diode $D_1$ changes to the conducting state and there is a zero voltage across its terminals if its threshold voltage is not taken into account.

The voltage $V_{LS}$ then assumes a waveform which is similar to that of the voltage $V_{S1}$ and the current $I_{LS}$ within the inductance coil $L_S$ increases sinusoidally until the instant $t_{12}$ at which the voltage $V_{LS}$ is again reduced to zero.

At this instant, the voltage $V_S$ is again equal to $V_{S1}$. The voltage $V_{S1}$ then decreases until it becomes negative and the voltage $V_{LS}$ assumes a negative value. The value of the current within the coil LS therefore decreases until it assumes a zero value which defines the instant $t_{13}$.

At this instant, the diode $D_1$ is again biased by a negative voltage and constitutes an open switch until the instant $t'_{11}$ which defines the instant of nullification of the voltage at the terminals of the assembly $L_S$ and $D_1$ as in the case of the instant $t_{11}$.

In order to ensure that the operation described in the foregoing takes place in an identical manner at each period, the mean current flowing through the capacitor $C_S$ must have a zero value. The output current IS is then equal to the mean currrent of $I_{LS}$ as shown in FIG. 2e.

It is observed in this diagram in which the switch 1 is only passive that, in the case of a value of the d.c. voltage $V_S$ as shown in FIG. 2b, there exists only one possible value of the current IS and therefore only one possible value for the load Rc.

In the case of a zero voltage Vs corresponding to a zero load Rc, the current IS is of maximum value; and in the case of a voltage Vs equal to the maximum value of the voltage $V_{S1}$ corresponding to an infinite load Rc, the current IS is zero.

Consideration will now be given to the complete diagram of FIG. 1 in which the transistor $T_1$ is in service or in other words operates as a controlled switch.

In accordance with one distinctive feature of the invention, a variation of the aforementioned output current in respect of a predetermined voltage $V_S$ and within a predetermined operating range is obtained by modifying the instant of closure of the transistor $T_1$. It is thus possible to control the values of the output voltages and currents of the power supply.

FIGS. 3 show diagrammatically the waveforms of voltages and currents in one mode of operation of the circuit according to the invention. FIG. 3a represents the voltage $V_{S1}$ across the terminals of the winding $S_1$ as a function of the time t; FIG. 3b represents the output voltage of $V_S$ as a function of t; FIG. 3c represents the voltage $V_D$ at the terminals of the diode $D_1$ as a function of t; and FIG. 3d represents the voltage $V_{LS}$ at the terminals of the inductance coil $L_S$ as a function of t. FIG. 3e provides a representation of the waveform of the current $I_{LS}$ within the inductance coil $L_S$ as well as the waveform of the output current IS.

At an instant $t_{21}$, the transistor $T_1$ is driven into saturation by applying a signal having a sufficient level to its base. The transistor $T_1$ then short-circuits the diode $D_1$ which had been biased by a negative voltage up to this instant.

The voltage $V_{S1}$ is always equal to the sum of the three voltages $V_S$, $V_D$ and $V_{LS}$.

At the instant $t_{21}$ of saturation of the transistor $T_1$, the diode $D_1$ is short-circuited and the voltage $V_D$ is therefore zero. Since the voltage $V_{S1}$ is negative at this instant, the voltage $V_{LS}$ at the terminals of the coil $L_S$ is therefore negative and the current $I_{LS}$ which is also negative decreases until the voltage $V_{LS}$ reverts to a zero value at an instant $t_{22}$.

At the instant $t_{22}$, the voltage $V_D$ is still zero, the voltage $V_{LS}$ falls to zero and the output voltage $V_S$ is equal to the voltage $V_{S1}$.

After this instant, the voltage $V_{LS}$ assumes a sinusoidal waveform which is similar to that of the voltage $V_{S1}$; and the current $I_{LS}$ which then had a minimum value increases up to the instant $t_{24}$ at which the voltage $V_{LS}$ reverts to a zero value.

At the instant $t_{23}$ comprised between the instants $t_{22}$ and $t_{24}$, the current $I_{LS}$ is zero; after this instant, it becomes positive.

The current therefore flows through the diode $D_1$ whereas it had been flowing through the transistor $T_1$ when $I_{LS}$ was negative.

The current $I_{LS}$ increases to a maximum value located at the instant $t_{24}$ and then decreases; the voltage $V_{LS}$ then has a negative value until it becomes zero, thus defining the instant $t_{25}$ at which the current $I_{LS}$ voltage, $V_{LS}$ are zero and at which a negative voltage reappears at the terminals of the diode $D_1$.

As in the previous case, the mean current through the capacitor $C_S$ must be zero in order to ensure that this operation is reproduced at each period in an identical manner. The output current IS is then equal to the mean current of $I_{LS}$.

In the case of FIGS. 3, the mean current of $I_{LS}$ is zero, taking into account the particular instant chosen for saturation of the transistor $T_1$.

The mean value of $I_{LS}$ and therefore IS decreases in a continuous manner when the transistor $T_1$ is caused to conduct between the instant $t_{11}$ of FIGS. 2 and the instant $t_{21}$ of FIGS. 3 and becomes negative in respect of an instant of turn-on which leads the instant $t_{21}$ in time.

It is therefore possible to vary the value of the output current between two maximum values, namely a positive value and a negative value, in respect of a given voltage $V_S$ by changing the instant of saturation of the transistor $T_1$.

In the embodiment of FIG. 1, the transistor $T_1$ is of the n-p-n-type and its emitter is connected to ground. It is possible to employ a p-n-p-type transistor, the emitter of which will be connected to the positive terminal of the capacitor $C_S$ and the collector of which will be connected to one terminal of the inductance coil $L_S$, the second terminal of which is connected to one terminal of the winding $S_1$, the second terminal of said winding being connected directly to ground.

Furthermore, since the current within the transistor $T_1$ falls to zero prior to conduction of the diode $D_1$, only its instant of closure is important. Said transistor $T_1$ can therefore be replaced by a thyristor in parallel with a diode as in the case of transistor $T_1$ or by any other suitable active switch.

In accordance with a distinctive feature of the invention, the transistor $T_1$ is controlled by a circuit 2, one example of which is shown in FIG. 1.

This circuit ensures closure of the transistor $T_1$ by applying a signal of suitable level to the base of said transistor at an instant which is dependent on the current, on the output voltage and on the a.c. voltage on the winding $S_1$ of the line transformer.

The base of a transistor $T_2$ is connected to a potentiometer P which is connected in series with two resistors $R_2$ and $R_3$. The assembly constituted by $R_2$, $R_3$ and P is in parallel with the capacitor $C_S$.

Said transistor $T_2$ compares that fraction of the output voltage $V_S$ which is given by the voltage divider $R_2$, $R_3$, P thus formed with a reference voltage delivered by a Zener diode connected in the emitter circuit of said transistor.

The transistor $T_2$ amplifies any error signal between its base voltage and its emitter voltage. The collector current of transistor $T_2$ is a function of the difference between the base voltage and the reference voltage and therefore of the difference between the output voltage $V_S$ and the reference voltage.

The collector current of transistor $T_2$ charges a capacitor $C_1$ which is connected between the collector of transistor $T_2$ and ground.

A transistor $T_3$ is mounted in parallel with the capacitor $C_1$, its collector being connected to the collector of transistor $T_2$ and its emitter being connected to ground. The base of said transistor $T_3$ is connected to a synchronizing circuit 3 which delivers from line pulses derived from a secondary winding $S_2$ of the line transformer a square-wave signal which controls the transistor $T_3$ which is turned-off in respect of a zero level of the signal. When the signal assumes a value given by the intrinsic characteristics of transistor $T_3$, this latter changes to the conducting state, short-circuits the capacitor $C_1$ and causes a bistable circuit constituted by two transistors $T_4$ and $T_5$ to revert to the nonconducting state immediately at the end of the line pulse.

In fact, said bistable circuit is connected to the collector output of the transistor $T_2$ through the emitter of transistor $T_4$. The emitter of transistor $T_5$ is connected to the base of transistor $T_1$.

Said bistable circuit is biased by the resistors $R_4$ and $R_5$.

When the transistor $T_3$ is open, the capacitor $C_1$ is charged by means of the collector current of transistor $T_2$ which is a function of the difference between the output voltage $V_S$ and the reference voltage. The slope of the voltage across the terminals of capacitor $C_1$ is directly dependent on the collector current of transistor $T_2$ and therefore directly on the difference between the voltage $V_S$ and the reference voltage.

When the voltage across the terminals of the capacitor $C_1$ exceeds the value imposed on the base of transistor $T_4$ by the bridge constituted by resistors $R_4$, $R_5$, the bistable circuit $T_4$, $T_5$ which had previously been cut-off becomes conducting, delivers a signal to the base of transistor $T_1$ which short-circuits the diode $D_1$. This state is maintained until conduction of transistor $T_3$ which short-circuits $C_1$ and restores the bistable circuit $T_4$, $T_5$ to the nonconducting state immediately at the end of the following line pulse.

The instant $t_{21}$ shown in FIGS. 3 is therefore directly dependent on the slope of the charge of capacitor $C_1$ and therefore on the collector current of transistor $T_2$ and therefore on the difference between the output voltage $V_S$ and the reference voltage.

When the output voltage $V_S$ increases, the collector current of transistor $T_2$ increases, the slope of the voltage across the terminals of capacitor $C_1$ increases, the instant $t_{21}$ of turn-on of transistor $T_1$ is advanced in time, the output current IS decreases, with the result that the output voltage $V_S$ also decreases. This accordingly constitutes a regulating loop.

The power supply circuit according to the invention has the advantage of being self-limited in current by reason of the fact that, when the load resistance is zero, the output current is limited by the value of the inductance $L_S$.

Furthermore, if the transistor $T_1$ is short-circuited between emitter and collector, the voltage $V_S$ becomes zero.

The circuit according to the invention is employed in transistorized television receivers. Since it has low dissipation, the circuit makes it possible to reduce the dissipated power within these receivers and is primarily useful in the case of small types of receivers.

What is claimed is:

1. A stabilized auxiliary power supply circuit comprising,
   connected in series in a loop, an active switch chopper,
   a secondary winding of a television receiver line transformer which delivers the line retrace signal,
   said winding being the exclusive source of power for said supply circuit,
   an induction coil,
   a capacitor having a sufficiently high capacatence to ensure that the alternating current voltage across the terminals of said capacator is negligible;
   and connected to said loop between said transformer and across said capacator, and to said active switch chopper, a control circuit synchronized with the line frequency and controlling the conduction of said active switch chopper.

2. A supply circuit according to claim 1, wherein the control circuit comprises a comparator stage for delivering an error signal which is a function of the difference between the output voltage and a reference voltage, and a driver stage for turning-on the active switch at an instant which is a function of said error signal and thus tends to reduce said signal to zero.

3. A supply circuit according to claim 1, wherein the active switch comprises a diode mounted in parallel with an n-p-n-type transistor, the collector of said transistor being connected to the cathode of said diode, the emitter of said transistor being connected to the anode of the diode, and the base of said transistor being connected to said control circuit.

4. A supply circuit according to claim 1, wherein the active switch comprises a diode mounted in parallel with an p-n-p type transistor, the collector of said transistor being connected to the anode of said diode, the emitter of said transistor being connected to the cathode of the diode, and the base of said transistor being connected to said control circuit.

5. A supply circuit according to claim 1, wherein the active switch comprises a diode mounted in parallel with a thyristor, the anode of said thyristor being connected to the cathode of said diode, the cathode of said thyristor being connected to the anode of the diode, and the gate of said thyristor being connected to said control circuit.

6. A supply circuit according to claim 2, wherein the comparator stage comprises a transistor in which the current flowing between the collector and emitter of said transistor is a function of the difference between the output voltage of the supply and a reference voltage imposed by a Zener diode connected in series with the emitter collector circuit of said transistor, and in which the driver stage includes a capacitor adapted to be loaded by the emitter-collector current of said transistor, said capacitor being in parallel with a bistable circuit which at an instant depending on the slope of the charge of the capacitor, and therefore depending on said emitter-collector current, turns-on the active switch which then tends to cancel the difference between the output voltage and the reference voltage.

7. A supply circuit according to claim 1, wherein the control circuit comprises means for adjusting the period of conduction of the active switch during each line scanning and therefore for adjusting the output voltage.

8. A supply circuit according to claim 1 wherein said capacitor is a polarized capacitor.

* * * * *